(12) United States Patent
Fleming et al.

(10) Patent No.: US 9,191,630 B2
(45) Date of Patent: Nov. 17, 2015

(54) DYNAMIC LAYOUTS

(75) Inventors: Hayden Graham Fleming, Ryde (AU);
Rajanish Calisa, Artarmon (AU);
Rupert William Galloway Reeve,
Dundas (AU); Andrew James Lo,
Balmain (AU)

(73) Assignee: CANON KABUSHIKI KAISHA,
Tokyo (JP)

( * ) Notice: Subject to any disclaimer, the term of this patent is extended or adjusted under 35 U.S.C. 154(b) by 976 days.

(21) Appl. No.: 12/446,607

(22) PCT Filed: Nov. 27, 2007

(86) PCT No.: PCT/AU2007/001818
§ 371 (c)(1),
(2), (4) Date: Jul. 7, 2009

(87) PCT Pub. No.: WO2008/074053
PCT Pub. Date: Jun. 26, 2008

(65) Prior Publication Data
US 2010/0027965 A1    Feb. 4, 2010

(30) Foreign Application Priority Data
Dec. 18, 2006    (AU) ................................ 2006252090

(51) Int. Cl.
*H04N 9/80*    (2006.01)
*H04N 7/18*    (2006.01)

(52) U.S. Cl.
CPC ..................................... *H04N 7/181* (2013.01)

(58) Field of Classification Search
CPC .......... H04N 7/17318; H04N 7/17336; H04N 7/163; G06K 9/00577; G06K 9/00664; G06K 9/72; G06K 9/78; G06K 9/00463; G06K 9/00536; G06K 9/036; G06K 9/2081; G06K 9/228; G06K 9/3233; G06K 9/6293; G08B 13/19697
See application file for complete search history.

(56) References Cited

U.S. PATENT DOCUMENTS

| | | | |
|---|---|---|---|
| 5,893,101 A | 4/1999 | Balogh et al. | |
| 5,893,110 A | 4/1999 | Weber et al. | |
| 6,707,476 B1 | 3/2004 | Hochstedler | 345/789 |
| 8,078,603 B1 * | 12/2011 | Chandratillake et al. | 707/706 |

(Continued)

FOREIGN PATENT DOCUMENTS

| | | |
|---|---|---|
| EP | 1477933 A1 | 11/2004 |
| EP | 1675377 | 6/2006 |

(Continued)

OTHER PUBLICATIONS

Extended European Search Report in related European Patent Application EP 07815619, dated Apr. 10, 2012.

(Continued)

*Primary Examiner* — Tat Chio
(74) *Attorney, Agent, or Firm* — Fitzpatrick, Cella, Harper & Scinto

(57) ABSTRACT

Methods of displaying video data are disclosed. The methods generate a plurality of queries for determining from which of a plurality of video data sources video data is to be displayed and store each of the queries. One of the queries is selected for display and the selected query is matched with metadata from one or more of the plurality of video data sources. The video data from the video data sources that match the query is displayed.

17 Claims, 13 Drawing Sheets

(56) References Cited

U.S. PATENT DOCUMENTS

| | | |
|---|---|---|
| 2002/0108127 A1 | 8/2002 | Lew et al. ............. 725/142 |
| 2002/0144293 A1 | 10/2002 | Dimitrova et al. |
| 2002/0152462 A1 | 10/2002 | Hoch et al. ............. 725/37 |
| 2003/0105743 A1 | 6/2003 | Ireton ..................... 707/3 |
| 2004/0125149 A1 | 7/2004 | Lapidous ............... 345/808 |
| 2004/0130620 A1 | 7/2004 | Buehler et al. |
| 2004/0246376 A1 | 12/2004 | Sekiguchi et al. ...... 348/468 |
| 2005/0146606 A1 | 7/2005 | Karsenty et al. ........ 348/143 |
| 2005/0232574 A1* | 10/2005 | Kawai ..................... 386/46 |
| 2005/0248652 A1 | 11/2005 | Firestone et al. ....... 348/14.09 |
| 2007/0024705 A1* | 2/2007 | Richter et al. .......... 348/142 |
| 2008/0086456 A1* | 4/2008 | Rasanen et al. ......... 707/3 |

FOREIGN PATENT DOCUMENTS

| | | | |
|---|---|---|---|
| WO | WO 02/43353 | 5/2002 | |
| WO | WO 2008/008505 A2 | 1/2008 | ............ H04N 7/18 |

OTHER PUBLICATIONS

Summons to attend oral proceedings dated Feb. 20, 2014 in counterpart European Application No. 07815619.7.

European Communication dated Oct. 7, 2014, in counterpart European Patent Application No. 07 815 619.7.

Summons to Attend Oral Proceedings dated Jul. 6, 2015 in counterpart European Patent Application No. 07 815 619.7.

* cited by examiner

DYNAMIC LAYOUTS

FIELD OF THE INVENTION

The present invention relates generally to digital video recording and, in particular, to a method and apparatus for displaying video data. The present invention also relates to a computer program product including a computer readable medium having recorded thereon a computer program for displaying video data.

BACKGROUND

There are many existing systems that perform networked digital video recording. Such systems are often comprised of readily available components. The components often include a TCP/IP network, one or more digital video cameras and one or more storage servers. Storage servers are computer systems running software that receives video data from the video cameras and stores the video data on a storage medium such as a hard disk drive. Some digital video recording systems also use viewing application software resident on remote computers. This viewing application software may be used for viewing live or pre-recorded video data received from either the video cameras or the storage servers. The live or pre-recorded video data may be viewed in one or more video windows generated by the viewing application software and rendered on a computer display.

The viewing application software described above typically provides the ability to extract pre-recorded video data from a given camera for storage in a video file. The video file may then be played back using any suitable media player, such as the Apple QuickTime™ media player. Additionally, some viewing application software provides the ability to view synchronised pre-recorded or live video data from multiple networked cameras (or sources of video data).

A problem with the conventional viewing application software described above is that it is difficult for an operator to effectively monitor pre-recorded or live video data from a large number of networked cameras.

Thus, a need clearly exists for a more efficient method of displaying video data.

SUMMARY

According to one aspect of the present invention there is provided a method of displaying video data, said method comprising the steps:

selecting one of the queries for display;
matching the selected query with metadata of a plurality of video data sources;
displaying the video data from the video data sources that matches the query; and
removing the video data from the display in a case that the corresponding video source no longer satisfies the selected query.

According to still another aspect of the present invention there is provided an apparatus for displaying video data, said apparatus comprising;

selection means for selecting one of a plurality of queries for display;
matching means for matching the selected query with metadata of a plurality of video data sources;
display means for displaying the video data from the video data sources that match the query; and
removing means for removing the video data from the display in a case that the corresponding video data source no longer satisfies the selected query.

According to still another aspect of the present invention there is provided a computer readable medium, having a program recorded thereon, where the program is configured to make a computer execute a procedure to display video data, said program comprising:

code for generating a plurality of queries for display;
code for matching the selected query with metadata of a plurality of video data sources;
code for displaying the video data from a video data source that matches the query; and
code for removing the video data from the display in a case that the corresponding video data source no longer satisfies the selected query.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
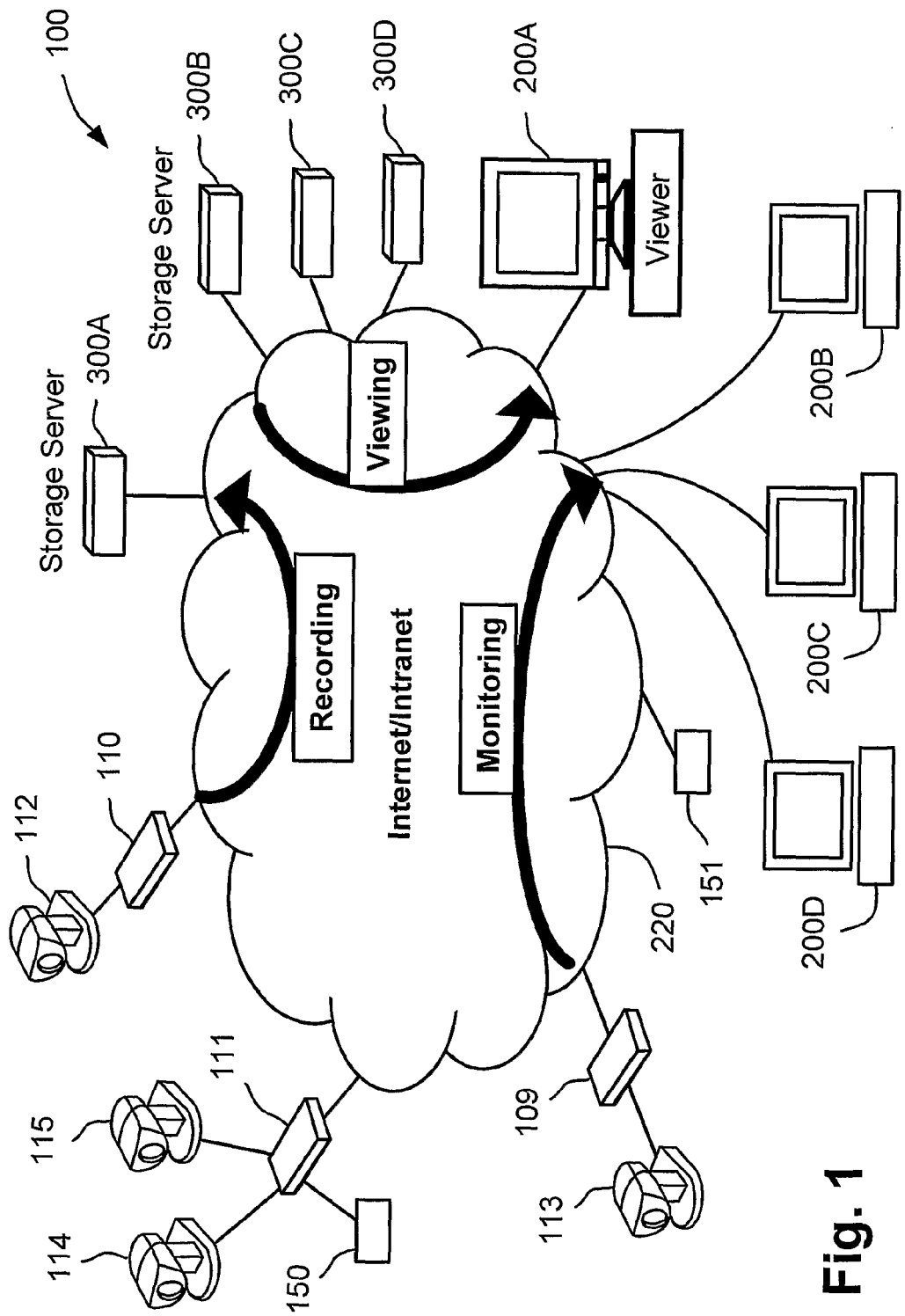
FIG. 1 is schematic diagram of a digital video recording system upon which embodiments described may be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Methods of displaying video data are described below with reference to FIGS. 1 to 14. The described methods display a selection of streamed video data based on a query on metadata, where the metadata is either associated with the video data or generated from the stream of video data.

In the exemplary embodiment, the described methods are implemented within a digital video recording system 100 as shown in FIG. 1. The digital video recording system 100 comprises video cameras 112, 113, 114 and 115 connected to a computer network 220, such as the Internet or an Intranet, via an associated camera server 109, 110 and 111. The network 220 may be a local area network (LAN). One or more of the cameras 112-115 may be configured within an associated camera server 109-111, such that the camera and camera server is a single unit.

Some examples of proprietary cameras 112-115 are the Canon™ VC-C4 video camera. Further, proprietary camera servers 109-111 include the Canon™ VB150 and the Canon™ VB-C10 where the VB-C10 is an example of a model where the camera and camera server is a single unit.

Each of the cameras 112-115 and the associated camera servers 109-111 are responsible for the capture of video data representing images. Accordingly, each of the cameras 112-115 may be referred to as "video data source". The video data is output by the camera servers 109-111 as a stream of video data. The camera servers 109-111 optionally comprise sensor inputs to which a sensor, such as the sensor 150 may be connected. As seen in FIG. 1, the sensor 150 is connected to the camera server 111. In this instance, if the sensor 150 is activated, then the camera server 111 may be configured to generate an event notification. As also seen in FIG. 1, sensors, such as the sensor 151, may also be connected directly to the network 220.

The cameras 112-115 and the associated camera servers 109-111 may also be configured to generate events internally by image analysis of video data as the video data is being captured by the camera 112-115. For example, the cameras 112-115 and the associated camera servers 109-111 may detect motion by frame differencing that generates event notifications when a preconfigured amount of difference between frames is detected. Such event notifications are typically described by metadata which will be described in detail below.

The system 100 also comprises storage servers 300A, 300B, 300C and 300D, which may be used for monitoring the output of video data from any one of the camera servers 109-111 and for recording (i.e., requesting and storing) the video data. The storage servers 300A, 300B, 300C and 300D may also be used for accessing video data, for event handling and for control of the system 100. The storage servers 300A, 300B, 300C and 300D may also be configured to record the events that are generated by the cameras 112-115 and the associated camera servers 109-111 as well as potentially creating and storing other events, such as recording start and stop events when the storage servers 300A, 300B, 300C and 300D start and stop recording the video data from any one of the camera servers 109-111. The storage servers 300A to 300D will hereinafter be generically referred to as the storage server 300, excepting where explicitly distinguished.

The video data captured by one or more of the cameras 112-115 and associated camera servers 109-111 may be streamed, via the computer network 220, from any one of the camera servers 109-111 to the storage server 300. The video data may be processed by the storage server 300 and/or stored on a hard disk drive 310 of the storage server (see FIG. 3), so that the video data may be viewed by a user using a display 314 (see FIG. 3) of the storage server 300.

Alternatively, the video data may be streamed, via the computer network 220, from the storage server 300 to one or more viewers 200A, 200B, 200C and 200D, as seen in FIG. 1. The viewers 200A to 200D will hereinafter be generically referred to as the viewer 200, excepting where explicitly distinguished.

The viewer 200 may be used for processing and displaying one or more frames of the exported video data. The viewer 200 may be configured to receive video data directly from one or more camera servers 109-111 and to present the video data to a user using the display device 214.

Figure 2:
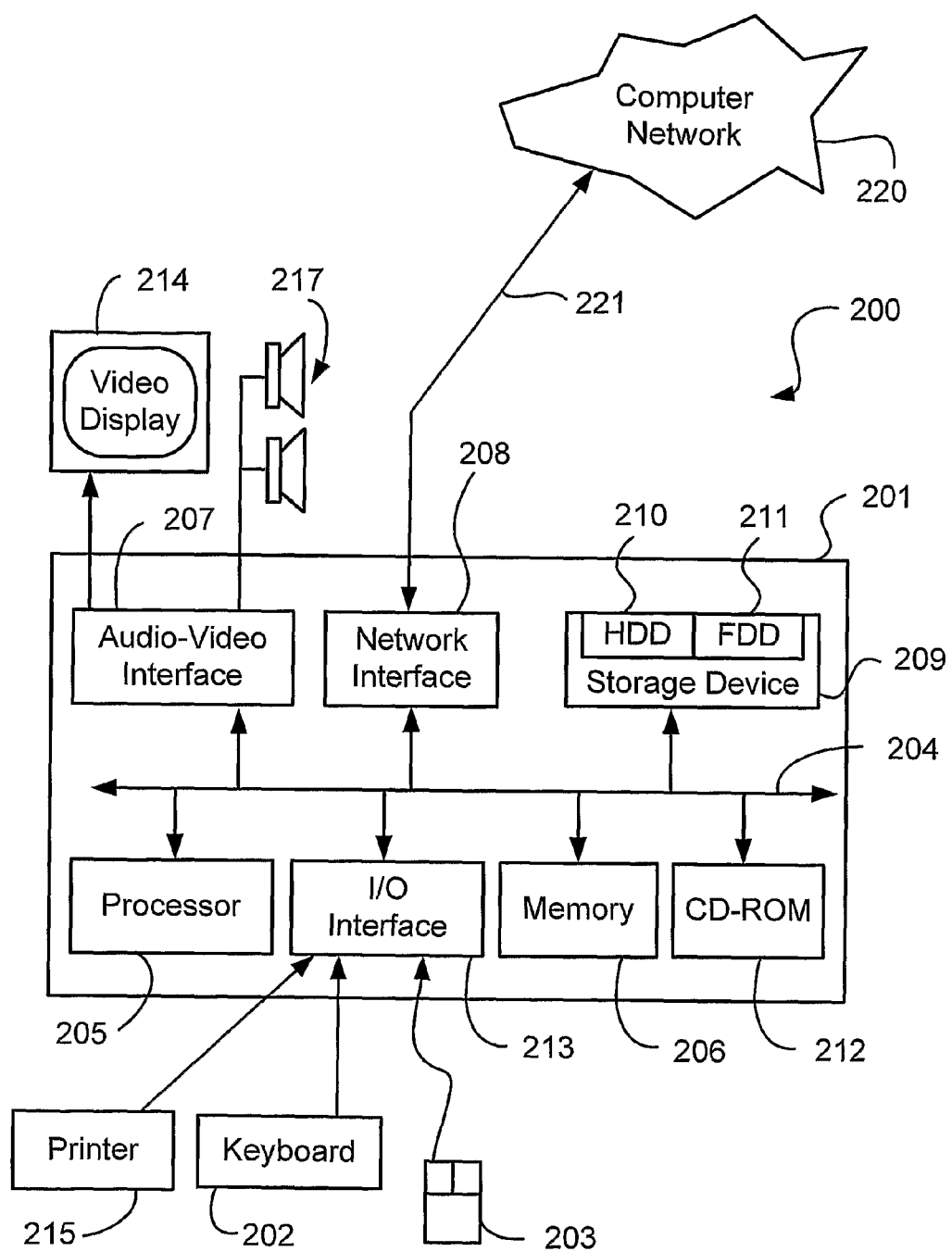
FIG. 2 is a schematic block diagram of a general-purpose computer upon which a viewer described herein may be practiced.

As seen in FIG. 2, the viewer 200 is preferably formed by a computer module 201, input devices such as a keyboard 202 and mouse 203, output devices including a printer 215, a display device 214 and loudspeakers 217. A network interface 208 configured within the computer module 201 may be used for communicating to and from the computer network 220, for example connectable via a network link 221 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 208 or otherwise, may also be used to obtain access to the computer network 220, via a telephone line for example.

The computer module 201 typically includes at least one processor unit 205, and a memory unit 206, for example, formed from semiconductor random access memory (RAM) and read only memory (ROM). The module 201 also includes a number of input/output (I/O) interfaces including an audio-video interface 207 that couples to the video display 214 and loudspeakers 217, an I/O interface 213 for the keyboard 202 mouse 203, printer 215 and optionally a joystick (not illustrated) or trackball (not illustrated). Optionally the module 201 may include a touch-screen (not shown) formed by an overlaid touch-sensitive surface on the video display 214, allowing user input by touching or moving a finger along the video display 214. A storage device 209 is provided and typically includes a hard disk drive 210 and a floppy disk drive 211. A magnetic tape drive (not illustrated) may also be used. A CD-ROM drive 212 is typically provided as a non-volatile source of data. The components 205 to 213 of the computer module 201, typically communicate via an interconnected bus 204 and in a manner, which results in a conventional mode of operation of a computer system as known to those in the relevant art. Examples of computers on which the described arrangements may be practiced include IBM-PC's and compatibles, Sun Sparcstations or alike computer systems evolved therefrom.

Figure 3:
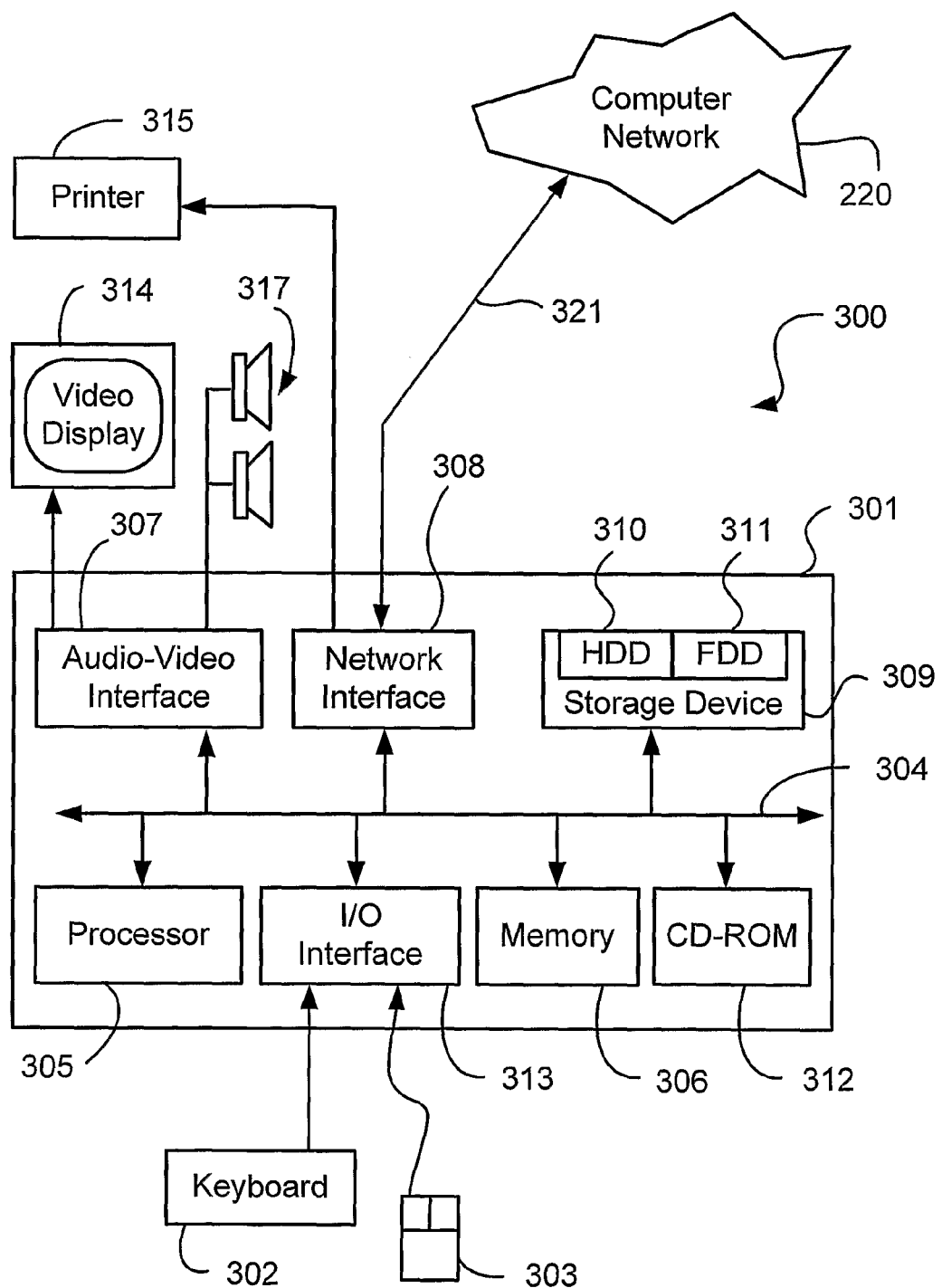
FIG. 3 is a schematic block diagram of a general-purpose computer upon which a storage server described herein may be practiced.

The storage server 300 is also shown in detail in FIG. 3. The storage server 300 is preferably formed by a computer module 301, input devices such as a keyboard 302 and mouse 303, output devices including a printer 315, a display device 314 and loudspeakers 2317. A network interface 308 is also configured within the computer module 301 and may be used for communicating to and from the computer network 220, for example connectable via network link 321 (such as a coaxial cable, a twisted pair cable, a fibre optic cable, a wireless connection using 802.11b or Bluetooth™ or other connection type). A Modulator-Demodulator (Modem) transceiver device (not shown) incorporated within the network interface 308 or otherwise, may also be used to obtain access to the computer network 220, via a telephone line for example.

Similar to the computer module 201, the computer module 301 typically includes at least one processor unit 305, and a memory unit 306, for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 313 for the keyboard 302, printer 315 and mouse 303 and optionally a joystick (not illustrated) or trackball (not illustrated). Optionally the module 301 may include a touch-screen (not shown) formed by an overlaid touch-sensitive surface on the video display 314, allowing user input by touching or moving a finger along the video display 314. A storage device 309 is provided and typically includes a hard disk drive 310 and a floppy disk drive 311. A magnetic tape drive (not illustrated) may also be used. Peripheral storage devices (not shown) connected to the computer module 301 may be used. In addition, network accessible storage devices or collections of such devices (not shown), including Network Attached Storage (NAS) and Storage Area Networks (SAN), may be connected to the network 220 and may be accessed through the network interface 308. A CD-ROM drive 312 is typically provided as a non-volatile source of data. The components 305 to 313 of the computer module 301, typically communicate via an interconnected bus 304 and in a manner, which results in a conventional mode of operation of such a computer system as known to those in the relevant art.

The camera servers 109-111 have a similar configuration to the computer modules 201 and 301. The camera servers 109-111 include a memory (e.g., memory 306) and a processor (e.g., a processor 305). However, the hardware configuration of the camera servers 109-111 will not be explained in further detail herein.

As described above, the storage server 300 may be used for monitoring and handling events from sensors (e.g., the sensor 150 attached to the camera server 111). One of these events may include motion detection using a motion detector (not shown) connected to one or more of the camera servers 109-111 directly. Further events include heat/smoke detection using a heat/smoke detector, a door opening/closing using a limit switch, for example.

The storage server 300 comprises a recording component and an access component. The recording component and the access component may be implemented as separate software applications resident on the hard disk drive 310 and being controlled in their execution by the processor 305. Alternatively, the recording component and access component may be implemented as a single software application. Further, one or both of the recording and component may be implemented in hardware.

The recording component may be used to retrieve live video data from one or more of the camera servers 109-111 and store the video data in the hard disk drive 310. The video data may be stored in a time-indexed form so that the video data may be later retrieved given a reference to the time that the video data was captured. Video data may be stored in a Motion JPEG format within a series of video files (e.g., QuickTime™ files). Each of the video files includes a file name containing start and end times for the video data stored in the file.

Additionally, the recording component records events, which may be generated from motion detected within the video data or from sensors (e.g., the sensor 150 attached to the camera server 111). Other types of events are also available as described above. Event data may be stored in text files where each event is described in an event record in such a text file. An event record may contain the time, priority and description of the event. The priority is typically a value between one (1) and five (5), where one (1) indicates an important event and five (5) indicates an unimportant event.

The access component provides access to video and event data stored by the recording component. The access component monitors what video and event files are available on the hard disk drive 310 for each camera 112-115, and which time periods are covered by the available files.

The access component executes a continuous loop to listen for remote requests from the viewer 200 for video or event data. Each request generated by the viewer 200 contains a flag indicating whether the request is a request for video or event data. Each request also contains two values indicating start and end times of the period of time for which video or event data is requested.

As described in detail below, metadata is continuously collected about the system 100. The viewer 200 maintains the metadata collected about the system 100 in the memory 206. Alternatively, the metadata collected about the system 100 is stored in the hard disk drive 210. The metadata can be static such as the location of the cameras 112-115, camera type and/or a user defined tag. The metadata may also be automatically generated by the cameras 112-115 such as on camera motion detection or the state of the sensor 150. The metadata may also indicate the status of some other part of the system 100 that may not be associated with a camera 112-115 such as whether or not the storage server 300 is recording from a particular camera 112-115 or the time of the day. The metadata is collected from the streams of video data and may be associated with the streams of video data.

Figure 4:
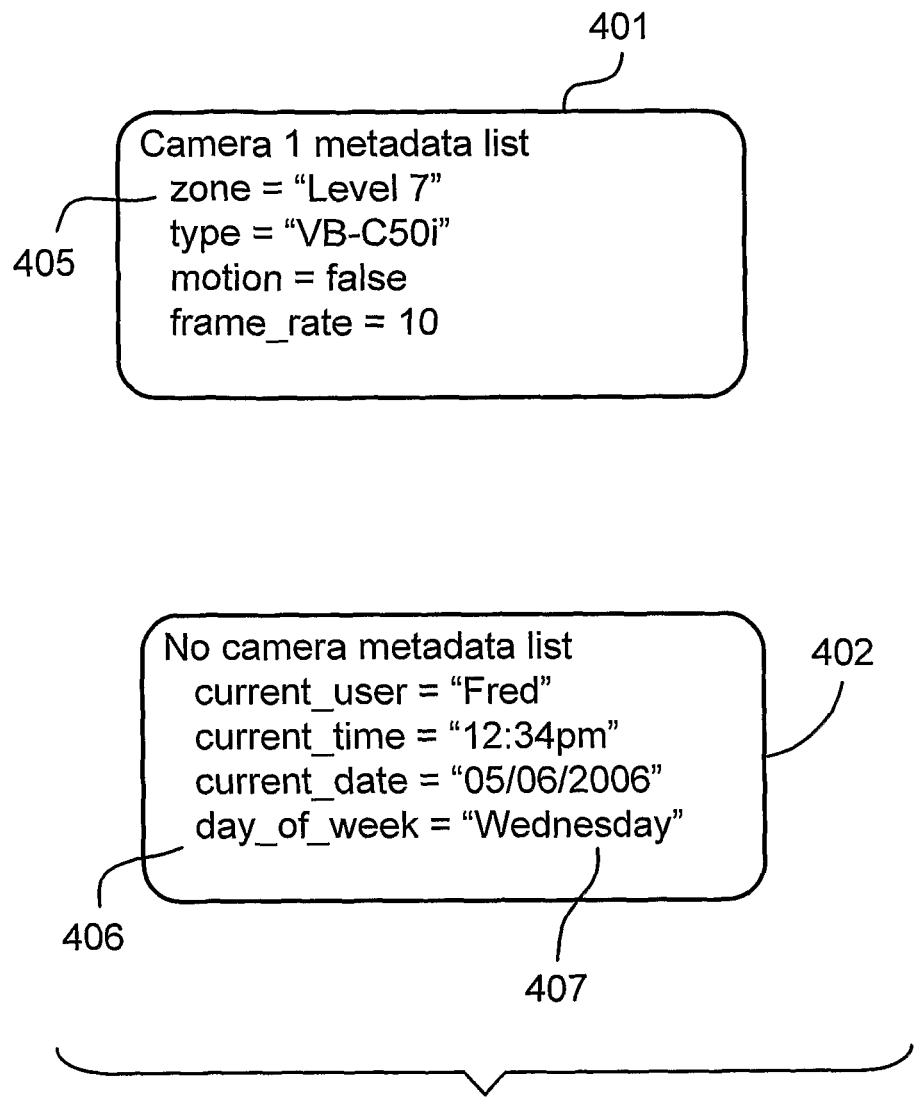
FIG. 4 shows two example metadata lists associated with the cameras of the system of FIG. 1.

Some of the metadata maintained by the viewer 200 is associated with the cameras 112-115. Metadata about a particular one of the cameras 112-115 is maintained in a list 401, as seen in FIG. 4, stored within the memory 206 by the processor 205 and attached to the particular camera 112-115. The data in the list 401 can include things like physical location of a camera 112-115 (e.g., zone="Level 7"), type of camera (e.g., type="VB-C50i"), current frame rate (e.g., frame_rate=10) and whether or not the camera 112-115 is currently detecting motion (e.g., motion=false). The assembly of the list 401 is preferably implemented in software executed by the viewer 200 using data from one or more of the storage servers 300 and/or cameras 112-115.

Other metadata maintained by the viewer 200 is not associated with one of the cameras 112-15. Such metadata may be maintained in a 'no camera metadata list' 402, as seen in FIG. 4, stored within the memory 206 by the processor 205. Examples of metadata that is not associated with a camera 112-115 includes such things as a current date (e.g., current_date="05/06/2006") and time (e.g., current_time="12:34 pm") and a current user (e.g., current_user="Fred"). Again, the assembly of the list 402 is preferably implemented in software executed by the viewer 200 using data from one or more of the storage servers 300 and/or cameras 112-115.

The metadata maintained by the viewer 200 is typically stored as an attribute-value pair (e.g., frame_rate=10) although any method of storing the metadata may be used provided the stored metadata can be tested against a predicate and is able to return a true or false response.

Figure 5:
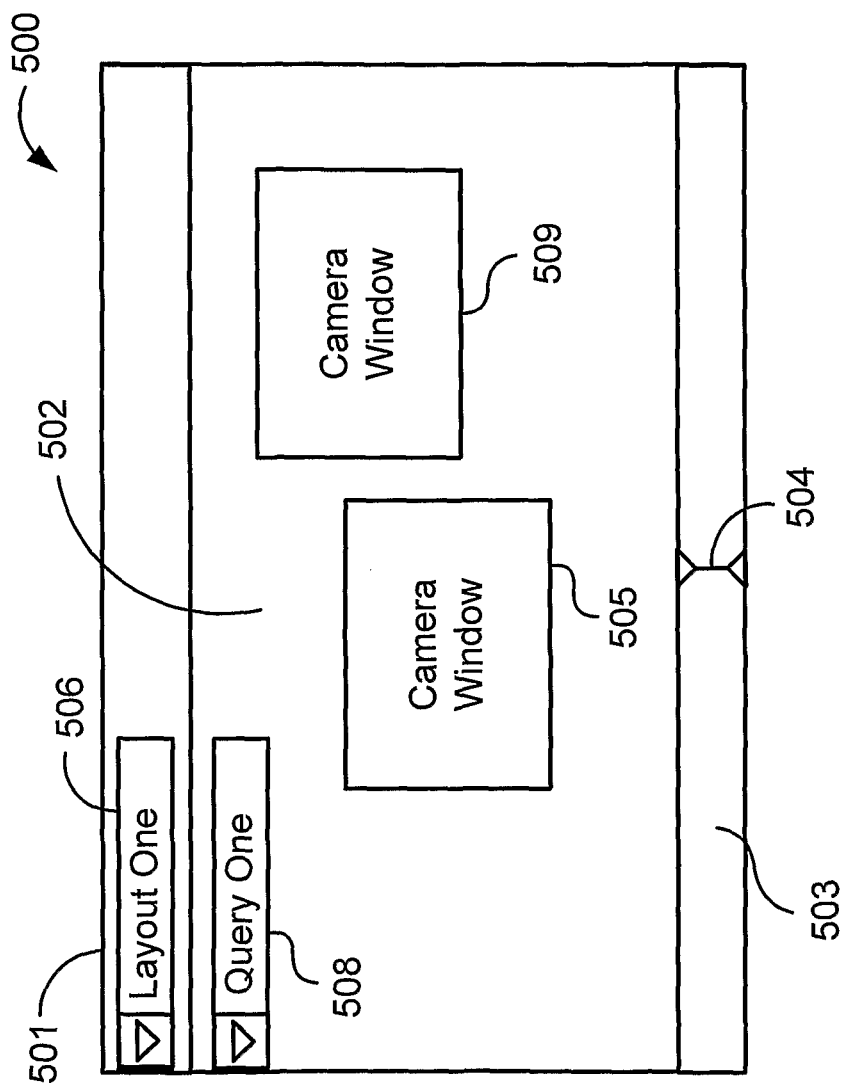
FIG. 5 shows an example of a graphical user interface (GUI) which may be used in the described embodiments.

FIG. 5 shows an example of a graphical user interface (GUI) 500 which may be used in the exemplary embodiment. The GUI 500 comprises a window 501 containing a layout 502. The layout 502 comprises video windows 505 and 509. A plurality of layouts, such as the layout 502, may be generated, each layout representing an arrangement of one or more video windows (e.g., 505, 509) for displaying video data captured by the cameras 112-115.

The window 501 also comprises a layout selector 506 and optionally may contain a timeline 503 and a playhead 504. The layout 502 is used to display the camera windows 505 and 509 showing live video data retrieved from one or more of the camera servers 109-111 or previously recorded video data.

A layout, such as the layout 502, has properties that control how the windows 505 and 509 are presented. These properties include, for example, the size of the window (e.g., 505) used to display the video data or a scheme for determining how the video data is positioned in the layout the 502. Accordingly, a selected layout may include settings for determining the size of the video windows in which the video data is displayed.

The layout 502 is associated with a query which consists of metadata based queries combined with Boolean operators. The query is used to select the video windows (e.g., 505) for display based on one or more criteria. In particular, the query is used for determining from which of the plurality of cameras 112-115 (or video data sources) video data is to be displayed based on the criteria associated with the camera 112-115. The query is continuously run on the metadata for the cameras 112-115.

Figure 10:
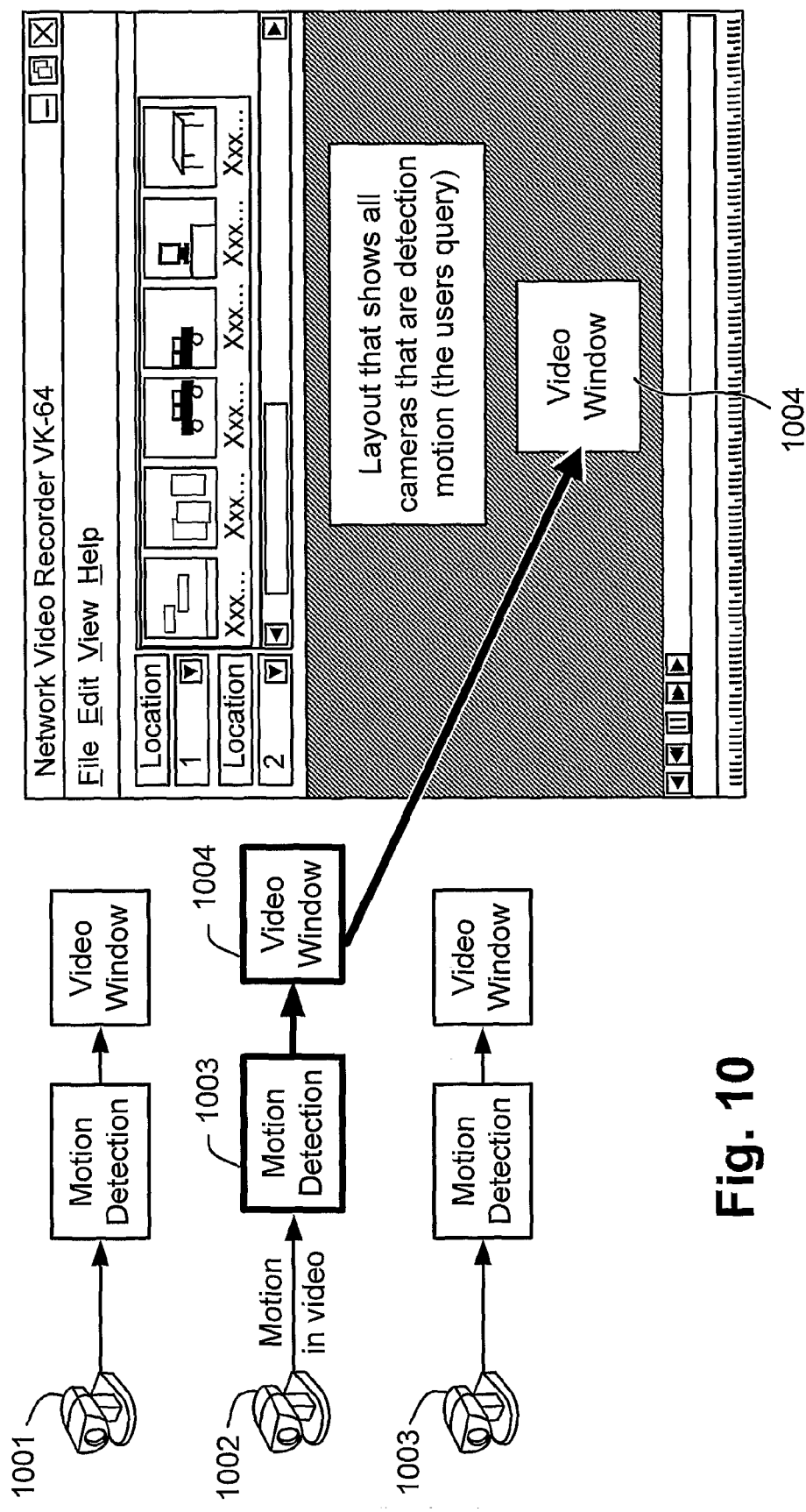
FIG. 10 shows a layout and cameras with a video window for one of the cameras being added to the layout.

As will be described in detail below, video windows (e.g., 505) associated with cameras 112-115 whose metadata matches the one or more criterion of a query are added to the layout 502. As an example, FIG. 10 shows a layout 1000 and cameras 1001, 1002 and 1003. The criterion of the query associated with the layout 1000 is for the layout 1000 to include video windows for all cameras 1001 to 1003 that detect motion. In the example, the camera 1002 detects motion, as indicated by a "Motion Detection" box 1003. Accordingly, a video window 1004 is added to the layout 1000 in order to display live video data captured by the camera 1002.

The query associated with the layout 502 is generated by the user for the particular requirements of the user. The user may load the layout 502 that contains the embedded query for selecting the video windows (e.g., 505) for display. The query associated with the layout 502 may be changed by using a query selector 508, as seen in FIG. 5, to a different user defined query. The processor 205 of the viewer 200 may be used for generating a plurality of predetermined queries. The user may select from the plurality of predetermined queries. Alternatively, the user may generate one or more new queries comprising different criteria by entering new query into the query selector 508 as a text string, for example, using known labels to reference metadata and boolean operators.

The viewer 200 and/or storage server 300 may also be used storing each of the queries with a corresponding one of a plurality of layouts, each layout representing an arrangement of one or more video windows for displaying video data. The settings that describe each of the layouts e.g., 502, including the corresponding query and associated criteria, may be stored on the viewer 200 or on the storage server 300 so that the settings can be retrieved from any of the storage servers 300 and displayed at any time.

The viewer 200 may be used for selecting (or determining) one of the layouts for display (i.e., for displaying video data), the layout having one or more corresponding criterion. Alternatively, the viewer 200 may be used for selecting one of the queries for display, the selected query having one or more corresponding criterion. As described in detail below, the viewer 200 or storage server 300 may be used for matching the criteria of the query associated with the selected layout (or the selected query) with metadata from one or more of the cameras 112-115 (or plurality of video data sources). When metadata associated with one of the cameras 112-115 matches (or satisfies) the criteria of the query associated with the selected layout 502 then one or more new video windows 505 and 509 showing live video data from that camera 112-115, are added to the layout 502. Accordingly, the video windows (505 and 509) may be used for displaying the video data from the cameras 112-115 (or video data sources) that match the query (i.e., the selected query or the query corresponding with the selected layout).

The storage server 300 may be configured to track the layouts and the viewer 200 that is currently displaying a particular layout. As described above, the storage server 300 and/or the viewer 200 may be configured for matching the criteria of the query associated with the particular layout to determine a matching subset of the cameras 112-115 for that particular layout. The storage server 300 and/or the viewer 200 may then update the layouts with respect to the video windows that are being displayed. These updates may then be propagated to the respective viewer(s) 200. The viewer(s) 200 then display live video data or pre-recorded video data for the camera subset associated with the layout being displayed. The viewer 200 may request layouts not already requested by other viewers. In one embodiment, once a requested layout is displayed by the viewer 200, updates to the layout may be sent from the storage server 300 to the viewer 200 as necessary.

Figure 14:
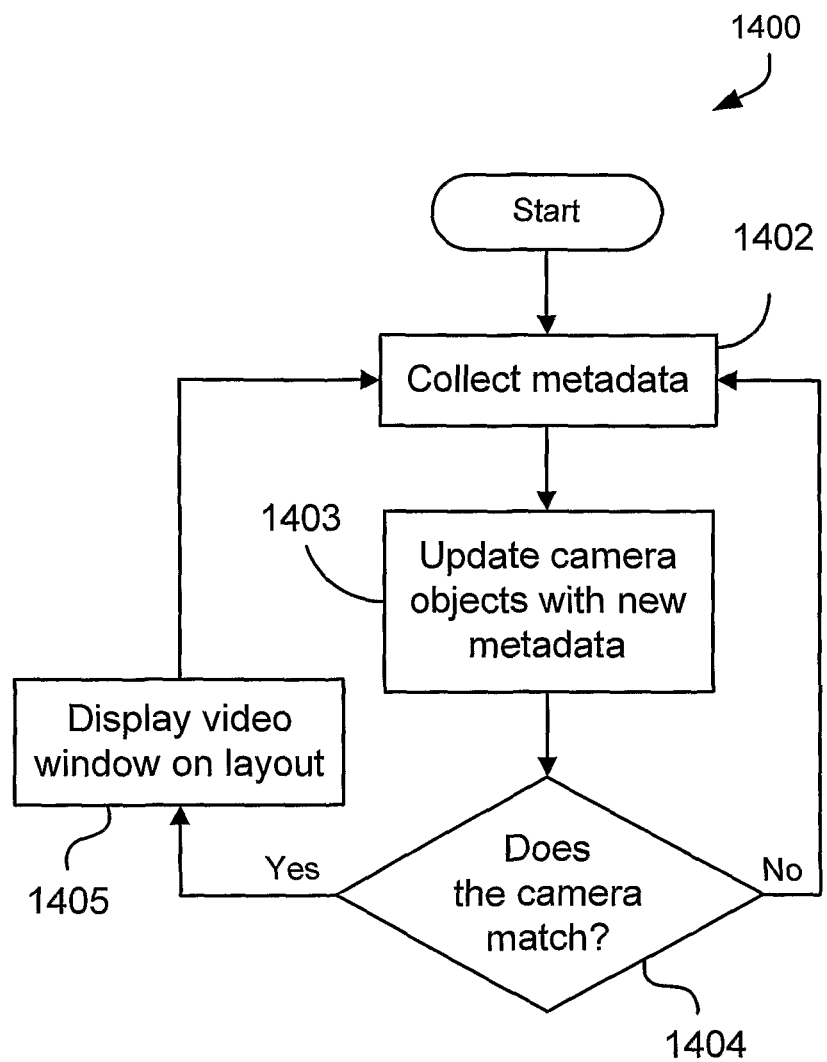
FIG. 14 is a flow diagram showing a method of adding a camera window to the layout of FIG. 5.

A method 1400 of adding a camera window to the layout 502 will be described in detail below with reference to FIG. 14. The method 1400 may be implemented as software resident in the hard disk drive 210 of the viewer 200 and being controlled in its execution by the processor 205.

The method 1400 begins at the first step 1402, where the processor 205 collects metadata from each the camera servers 109-111 associated with each of the cameras 112-115. The processor 205 also collects metadata from other sources such as the storage server 300.

Then at the next step 1403, the processor 205 collates the collected metadata and updates the metadata (e.g., the metadata lists 401) associated with each of the cameras 112-115 if the metadata has changed since the last time the metadata was collected. Metadata that is not associated with any of the cameras 112-115 is stored separately by the viewer 200.

At the next step 1404, if the processor 205 determines that the metadata associated with any of the cameras 112-115 satisfies the criteria of the query associated with the selected layout 502 then the method 1400 proceeds to step 1405. Otherwise, the method 1400 proceeds to step 1402. At step 1405, for each of the cameras 112-115 that satisfy the criteria of the query a new video window (e.g., 505) showing live video data from that camera 112-115 is added to the to the layout 502.

When the metadata associated with one of the cameras 112-115 changes, then the metadata list (e.g., 401) associated with that camera 112-115 is updated and the query is re-evaluated for that camera 112-115. If metadata not associated with any camera 112-115 changes then the query is re-evaluated for all cameras 112-115.

Once video windows (e.g., 505, 509) showing live video data from a particular camera 112-115 have been added to the layout 502, a condition under which the camera 112-115 will be removed from the layout 502 is stored with the layout 502 along with the query. For example, one such condition may be based on a predetermined duration (or predetermined time) from the last time the camera 112-115 satisfied the query conditions. Further, a video window (e.g., 505, 509) showing live video data from a particular camera 112-115 may be removed from the layout 502 as soon as the metadata associated with that particular camera 112-115 (or video data source) no longer satisfies the criteria of the selected query. Still further, a video window (e.g., 505, 509) showing live video data from a particular camera 112-115 may be removed from the layout 502 a predetermined period (or time) after the metadata associated with that particular camera 112-115 (or video data source) no longer satisfies the criteria of the selected query. Still further, a video window (e.g., 505, 509) showing live video data from a particular camera 112-115 may be removed from the layout 502 as soon as the video window is acknowledged by an operator. Still further, a video window (e.g., 505, 509) showing live video data from a particular camera 112-115 may be removed from the layout 502 after a predetermined time.

Figure 6:
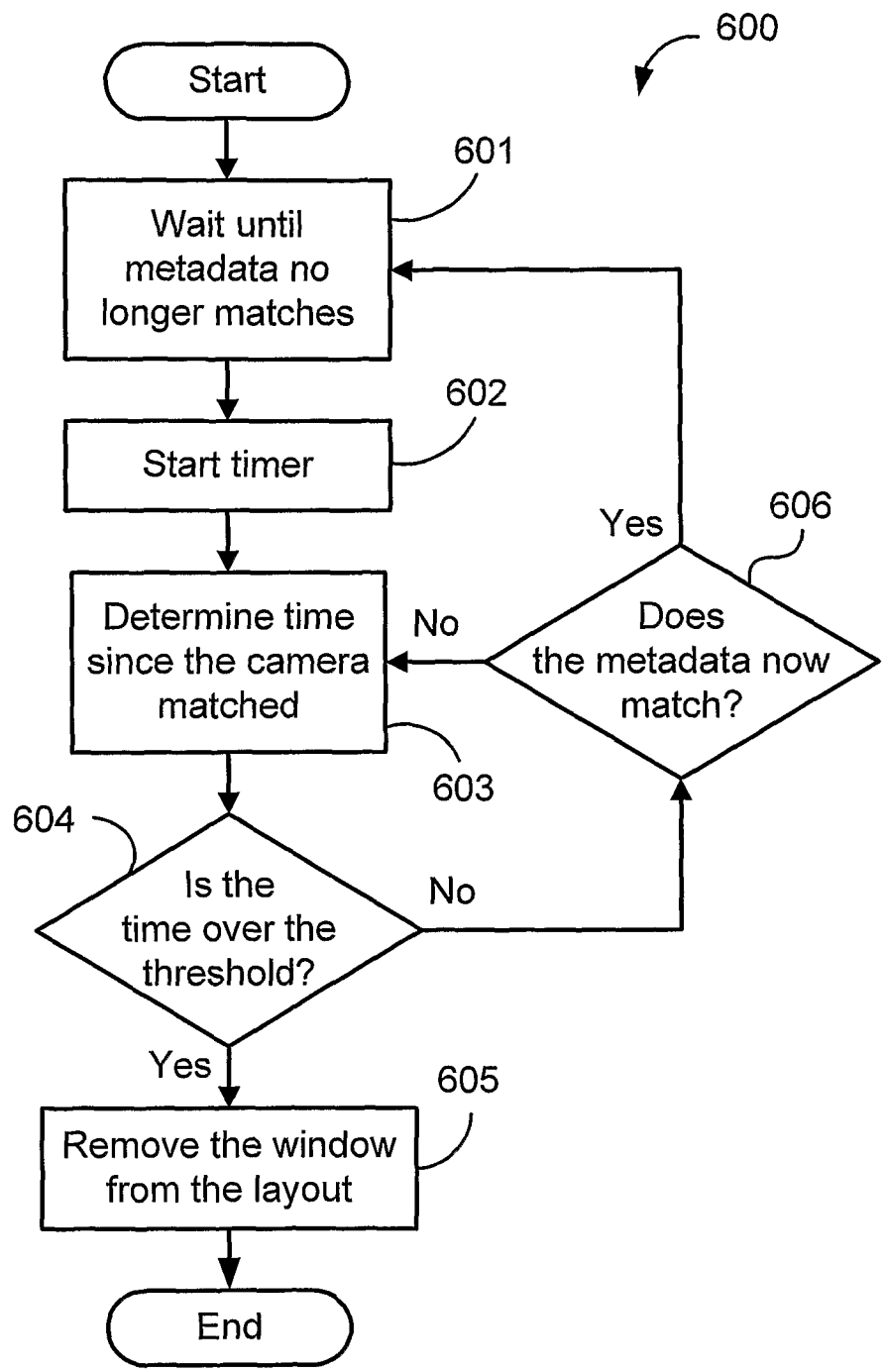
FIG. 6 is a flow diagram showing a method of removing a video window from the layout of FIG. 5.

A method 600 of removing a video window (e.g., 505), showing live video data from a particular camera 112-115, from the layout 502, will now be described with reference to FIG. 6. The method 600 may be implemented as software resident on the hard disk drive 210 and being controlled in its execution by the processor 205.

At the first step 601, the processor 205 waits until metadata associated with the camera 112-115 no longer matches criteria of the query associated with the layout 502. Once the metadata associated with the camera 112-115 no longer matches the criteria of the query associated with the layout 502, the method 200 proceeds to step 602 where the processor 205 starts a timer.

Then at the next step 603, the processor 205 determines how long it has been since the metadata associated with the camera 112-115 matched the criteria of the query. Then at the next step 604 if the time determined at step 603 is longer then a predetermined threshold value (or timeout value), then the method 600 proceeds to step 605. Otherwise, the method 600 proceeds to step 606. At step 606, the processor 205 removes the video window from the layout 502 and the method 600 concludes.

At step 606, if the processor 205 determines that the metadata for the camera 112-115 now matches the query, then the method 600 returns to step 601. Otherwise, the method 600 returns to step 603. At step 601, the processor 205 waits until the metadata associated with the camera 112-115 no longer matches the query.

In one embodiment of the method 600, the predetermined threshold value (or timeout value) may be varied depending on what caused the window (e.g., 505) to be displayed or the relevance of the event that caused the window (e.g., 505) to be displayed. Still further, the predetermined threshold value (or timeout value) may be varied depending on priority of a particular camera 112-115. For example, if the metadata associated with the camera 112-115 was the triggering of a motion alarm in the vault of a bank, then the video window displaying live video from the camera 112-115 may remain on the display 214 longer to increase the chances of somebody seeing the alert. The predetermined threshold value (or timeout value) may also be varied depending on which of the cameras 112-115 was being displayed. Still further, the predetermined threshold value (or timeout value) may be varied depending on the number of video windows (e.g., 505) that are being displayed in the layout 502. For example, the predetermined threshold value associated with video windows may be decreased as more video windows are added to a layout.

In one embodiment, the video window displaying live video from one of the cameras 112-115 remains on the display 214 for a predetermined period of time. Accordingly, the video data is displayed in a particular video window for a predetermined period of time. After the predetermine period of time the video window may fade away. Again, such a predetermined period of time may be also be referred to as a "timeout value".

Figure 7:
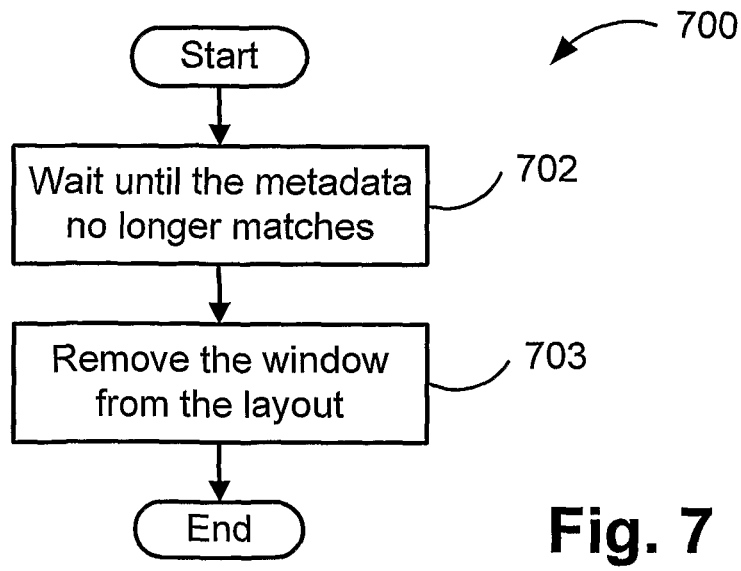
FIG. 7 is a flow diagram showing a further method of removing a video window from the layout of FIG. 5.

A further method 700 of removing a video window (e.g., 505), showing live video data from a particular camera 112-115, from the layout 502, will now be described with reference to FIG. 7. The method 700 may be implemented as software resident on the hard disk drive 210 and being controlled in its execution by the processor 205.

The method 700 removes the video window as soon as metadata associated with the camera 112-115 no longer matches the criteria of the query associated with the layout 502.

At the first step 702, the processor 205 waits until the metadata associated with the camera 112-115 no longer matches the criteria associated with the query associated with the layout 502. The processor 205 then immediately removes the video window (e.g., 505), showing live video data from the camera 112-115, from the layout 502, at the next step 703.

Figure 8:
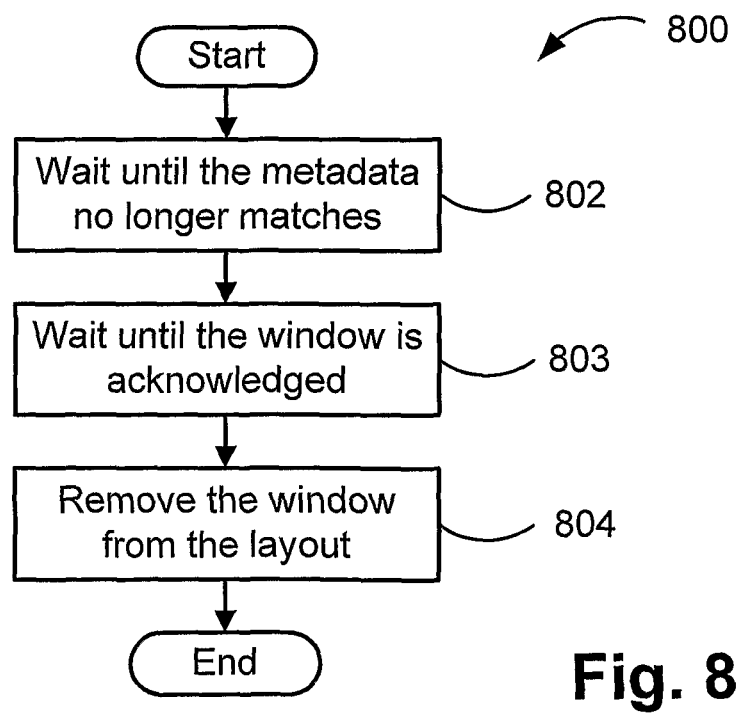
FIG. 8 is a flow diagram showing a still further method of removing a video window from the layout of FIG. 5.

A further method 800 of removing a video window (e.g., 505), showing live video data from a particular camera 112-115, from the layout 502, will now be described with reference to FIG. 8. The method 800 may be implemented as software resident on the hard disk drive 210 and being controlled in its execution by the processor 205. The method 800 removes the video window (e.g., 505) from the layout 502 when an operator of the system 100 acknowledges that the video window has appeared in the layout 502.

The method 800 begins at the first step 802, where the processor 205 waits until the metadata associated with the camera 112-115 no longer matches the query associated with the layout 502. At the next step 803, the processor 205 waits until the operator has acknowledged the video window (e.g., 505) showing live video data from the camera 112-115. This acknowledgement may typically be performed by clicking on a button on the layout 502 or by selecting a menu item. Upon the operator acknowledging the video window (e.g., 505), at the next step 804, the video window is removed from the layout 502.

Figure 9:
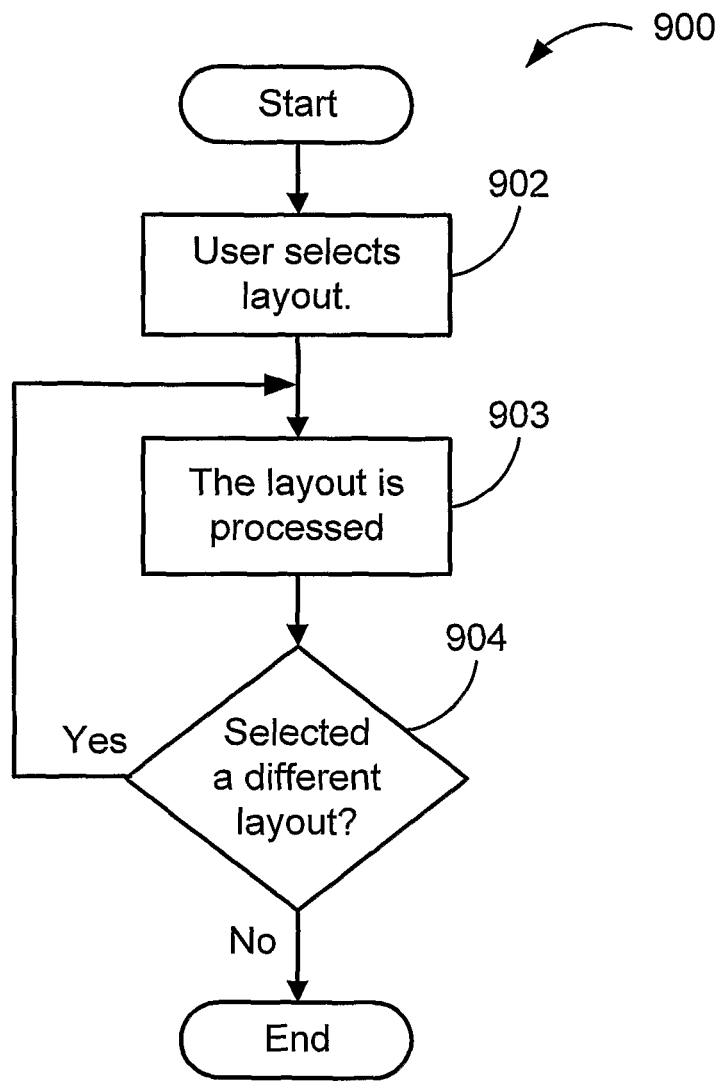
FIG. 9 is a flow diagram showing a method of selecting a layout.

A method 900 of selecting a layout will now be described with reference to FIG. 9. The method 900 may be implemented as software resident on the hard disk drive 210 of the server 200 and being controlled in its execution by the processor 305.

The method 900 begins at the first step 902, where a layout is selected. For example, the user may select the layout using the layout selector 506 of the GUI 500 displayed on the display 214 of the viewer 200. The processor 205 then typically uploads this selection to the storage server 300. At the next step 903, the processor 305 processes the layout. In particular, at step 903, the processor 305 determines one or more of the plurality of cameras 112-115 (or video data sources) that satisfy the criteria associated with the query corresponding to the selected layout. Video windows (e.g., 505) for any of the cameras 112-115 that satisfy the criteria of the query are added to the layout. Then at the next step 904, if the processor 305 determines that another layout has been selected, the method 900 returns to step 903. Otherwise, the method 900 concludes.

The methods described above can be combined or applied to different cameras 112-115 as selected by the user.

The metadata is typically stored as a list (e.g., 401) of attribute-value pairs, as described above with reference to FIG. 4. Each element such as the element "zone" 405 in the list 401 can store a single attribute (e.g., "Level 7") which can be one of a number of types. The attribute may be a Boolean value, a number or a text string. The elements (e.g., "zone") are updated by the viewer 200 as the metadata changes.

One example of metadata is the location of a particular camera 112-115. For example, the system 100 may classify the cameras 112-115 by the level of a building where the cameras 112-115 are located. In this instance, the value of the attribute (e.g., zone) may be a string description of where the camera is situated (e.g., "Level 7"). This value probably would not change very often.

Another example of metadata used is motion detection on the video data. In this instance, a difference between sequential frames of video data is determined and when the level of difference is more than a predetermined threshold then a motion attribute (e.g., "motion") for that camera 112-115 is triggered. Typically a motion detection attribute has a corresponding Boolean value and when motion is triggered then the attribute value is set to "true", as seen in the list 401. Accordingly, video data from one of the plurality of cameras 112-115 (or video data sources), which meets the criterion (or criteria) of a query, may be selected. The selected video data may then be displayed within a layout associated with the query.

An example of metadata that is not associated with any particular camera 112-115 is the day of the week. Such metadata is stored in the list 402 that is not associated with any camera 112-115 as an attribute 406 called "day_of_the_week" which has a string value 407 that is the day of the week (i.e., "Wednesday"). This process is continued for all metadata that is being monitored.

The length of time a video window (e.g., 505) showing live video data from a particular camera 112-115 is displayed on the layout 502 can be related to the camera 112-115. Each camera 112-115 may be assigned a timeout value (or predetermined threshold value) by the user and that value is used for the timeout value rather than a global default timeout value when that camera 112-115 is on the layout 502. The timeout value may be dependent on relevance of an event (e.g., motion detection) or priority of the camera 112-115

In one embodiment, a different weight may be assigned to the various attributes of metadata in the query associated with the layout 502. In this instance, when metadata associated with a particular camera 112-115 matches the query associated with the layout 502 then the different weights may be added up to determine the duration of the timeout for the video window showing live video data from that particular camera 112-115. There may be multiple ways for the metadata associated with the camera 112-115 to satisfy the query associated with the layout 502.

As described above, the video data is displayed by the viewer 200 (i.e., a first computer) connected to a network 220 and the selected layout and corresponding query are stored on the viewer 200 (i.e., the first computer). In another embodiment, the video data is displayed by the viewer 200 (i.e., the first computer) connected to the network 220 and the selected layout and corresponding query are stored on the storage server 300 (i.e., the second computer) connected to the network 220. In this instance, the query corresponding with the layout 502 may be evaluated on the storage server 300 either in part or completely. The system 100 ensures one viewer 200 is watching each of a set of cameras 112-115 having metadata that match the query by running the query on the storage server 300. The storage server 300 performs all the required actions to run the query on the set of cameras 112-115 and then when the metadata associated with one of the cameras 112-115 matches the query, the storage server 300 informs one of the viewers 200 that the video data from that camera 112-115 needs to be viewed. The storage server 300 also instructs the viewer 200 when the video window associated with that camera 112-115 should be removed from the layout 502.

In one embodiment, previously recorded video data for a particular camera 112-115 may be viewed on the viewer 200 rather than just live video data from the camera 112-115. In such an embodiment, when a video window (e.g., 505) associated with a particular camera 112-115 is displayed on the layout 502, previously recorded video data for that camera 112-115 is requested from the storage server 300. The period of recorded video data that is requested may be defined by a parameter that is stored with the query in the layout 502. For example, the layout 502 may contain instructions to play back video data from five seconds before the metadata associated with the camera 112-115 matched the criteria of the stored query and the video window for that camera 112-115 was added to the layout.

Figure 13:
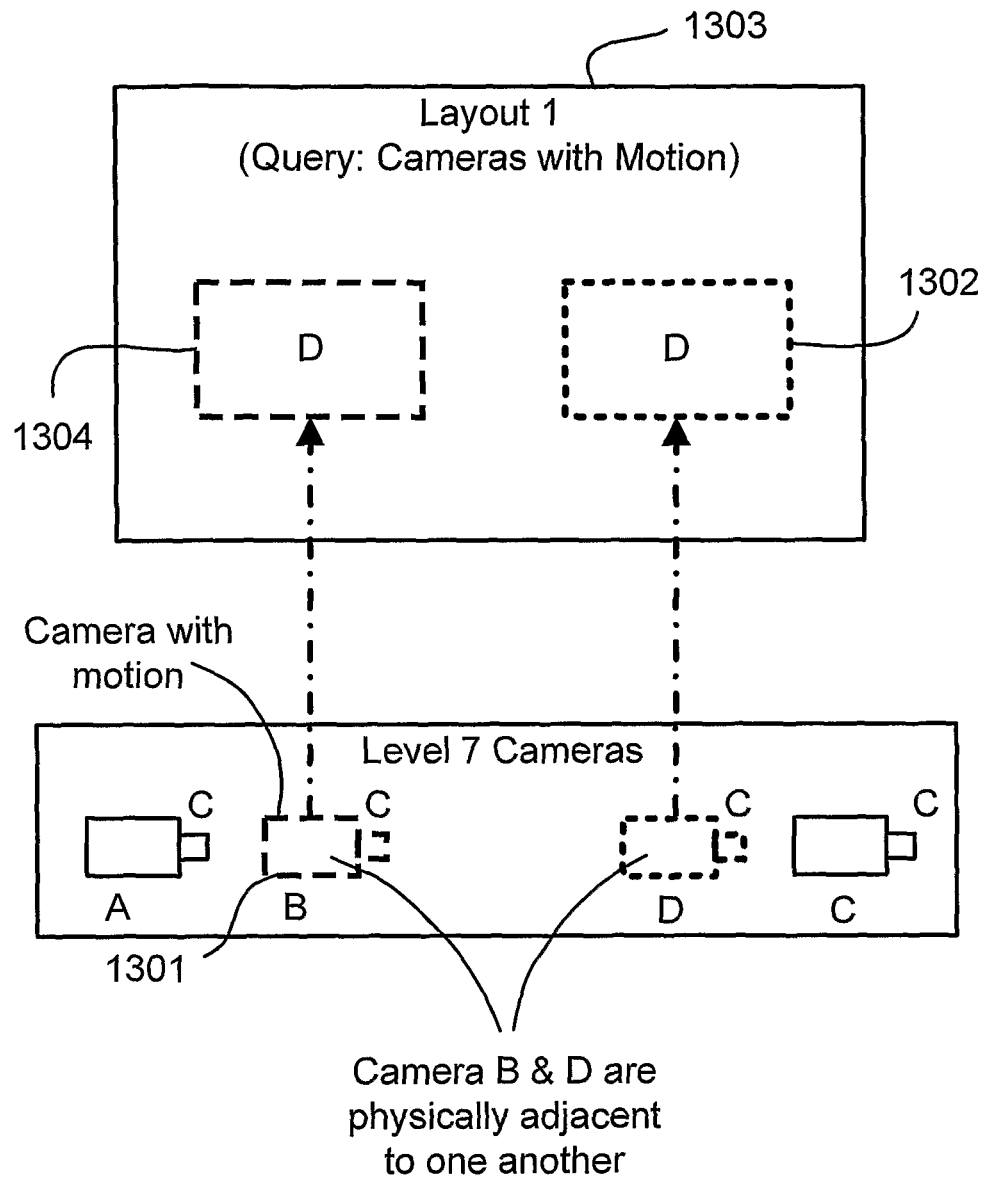
FIG. 13 shows a layout with two video windows, one of the video windows displaying live video data from a particular camera and the other video window displaying pre-recorded video data from that camera.

In still another embodiment, one video window of a layout may display live video data from a particular camera while another video window in the layout displays pre-recorded video data from that camera. For example, as seen in FIG. 13, a camera 1301 may be activated, for example, through activation of a sensor associated with the camera 1301. In this instance, a video window 1302 is added to a layout 1303 to show live video data from the camera 1301. Further, another video window 1304 is added to the layout 1303 to display pre-recorded video data (e.g., for the previous thirty seconds) for the camera 1301.

Figure 12:
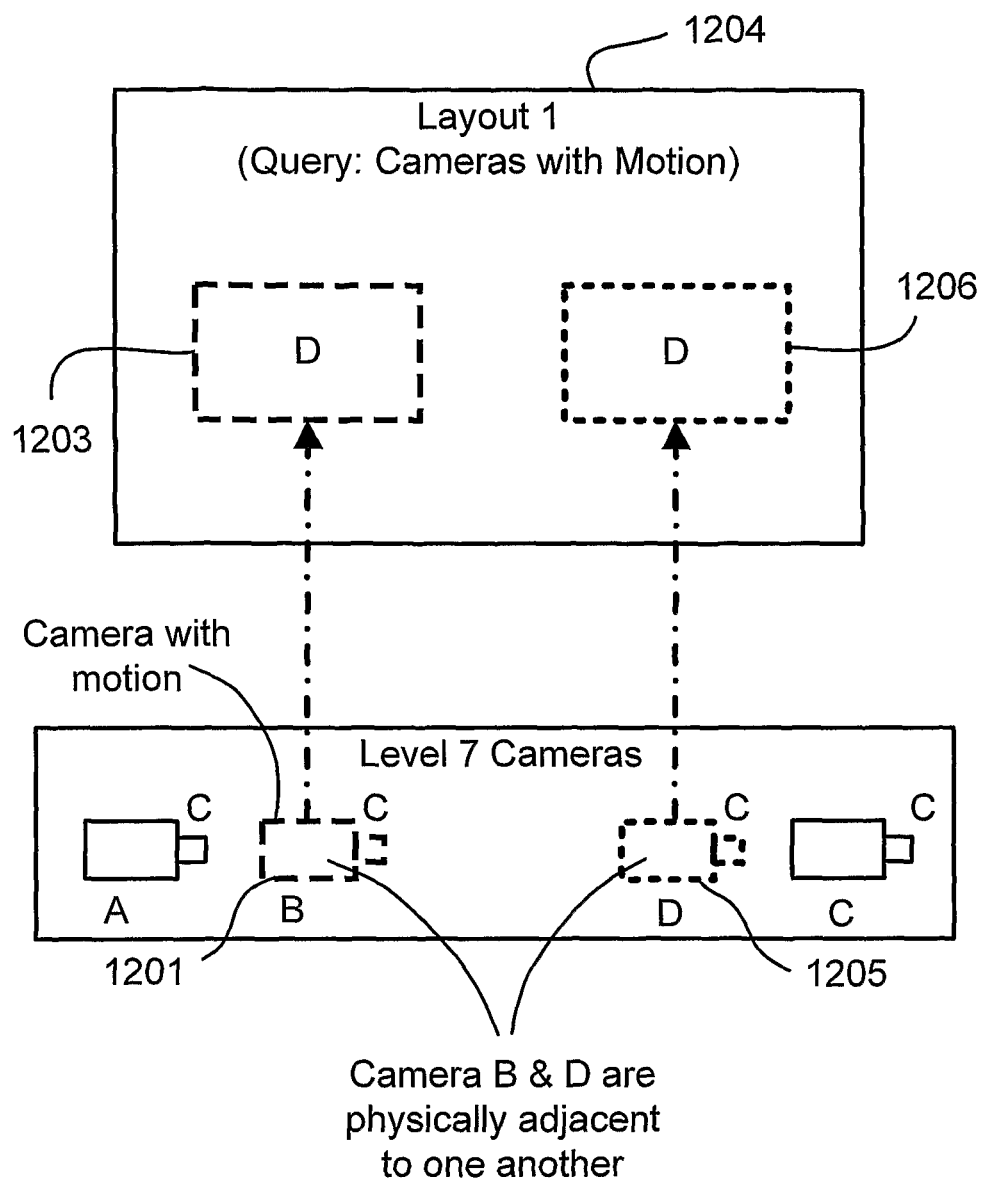
FIG. 12 shows a layout with two video windows displaying video data from associated cameras.

In still another embodiment, in addition to displaying video windows (e.g., 505) showing live video data from cameras matching a query corresponding to a layout, the query may be configured to show related video data. For example, as seen in FIG. 12, motion may be detected in the video data captured by a camera 1201. Accordingly, a video window 1203 is added to layout 1204, showing live video data from the camera 1201. In the example, camera 1205 is associated with the camera 1201 because the cameras 1205 and 1201 are mounted in the same room. That is, the cameras 1205 and 1201 are physically adjacent to one another. Accordingly, a video window 1206 is added to the layout 1204 to show live video data from the camera 1205. In still another embodiment, the query corresponding with the selected layout 502 controls the size of the video windows (e.g., 505, 509) in which the video data is displayed.

Figure 11:
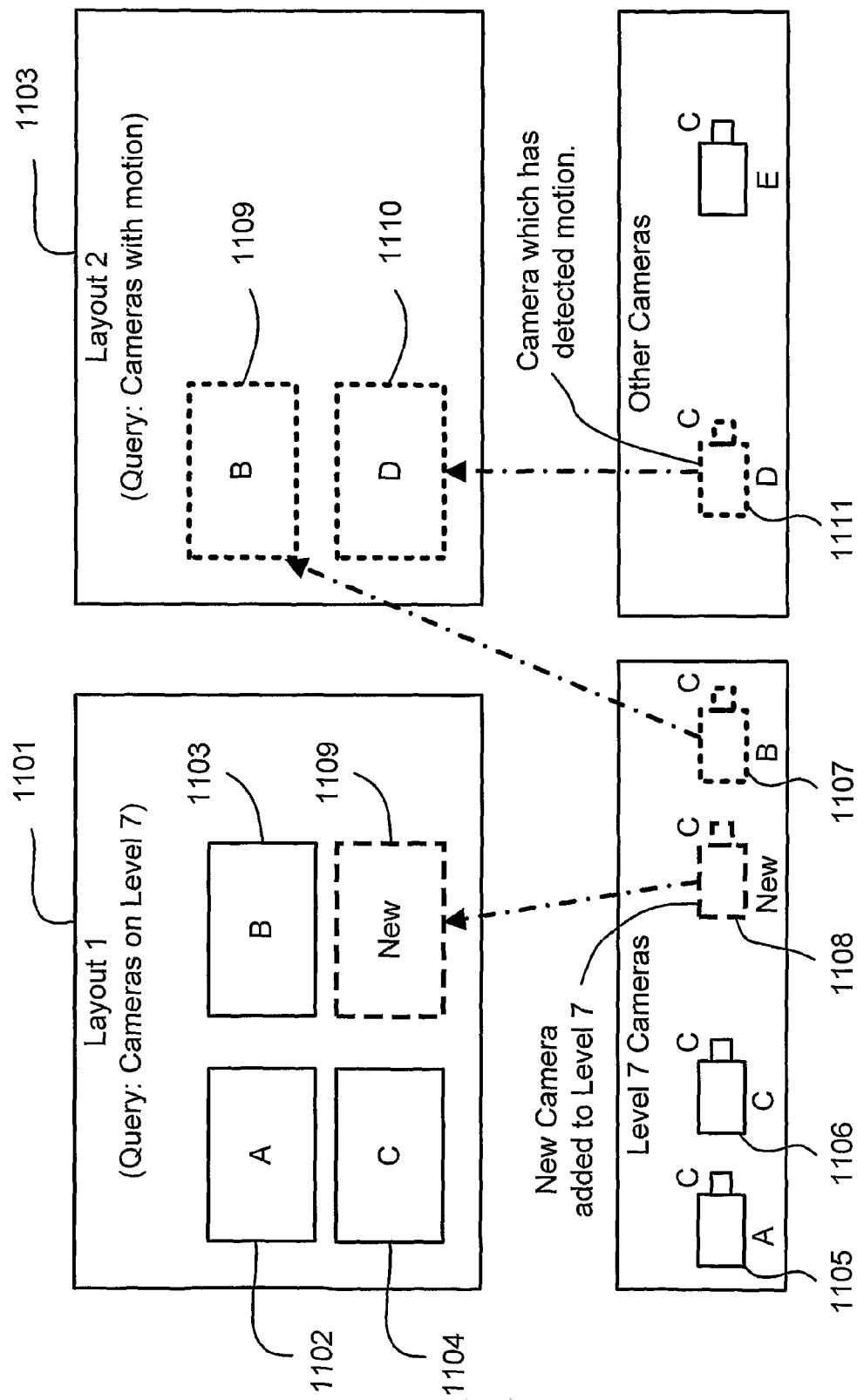
FIG. 11 shows two different layouts and the video windows displayed in those layouts depending on the queries associated with each of the layouts.

In another embodiment, when the metadata associated with a particular camera 112-115 matches the criteria of a query for the layout 502 and the video window (e.g., 505) for that camera 112-115 is displayed on the layout 502, another video window (e.g., 509) from the same camera 112-115 is also displayed with the video window 509 showing pre-recorded video data from the thirty (30) seconds prior to determination that the metadata associated with the camera 112-115 matched the criteria of the query. The described methods allow different layouts having different corresponding queries to be selected by the user. In one example, as seen in FIG. 11, a layout 1101 includes video windows 1102, 1103 and 1104 displaying live video for all cameras 1105, 1106 and 1107 on Level (7). Accordingly, the query associated with the layout 1101 is "Cameras on Level 7". In the example, a "New" camera 1108 is added. Accordingly, a new video window 1109 is added to the layout 1101 to show live video data from the newly added camera 1108. In contrast, layout 1103 includes video windows 1109 and 1110 showing live video data from all cameras 1109 and 1111 where motion has been detected. Accordingly, the query associated with the layout 1103 is "Cameras with motion".

The advantages of the methods described above are that the user only sees video windows that are considered interesting in the context of a current layout. Further, the layouts, such as the layout 502, are dynamic and are not constrained to pre-defined templates. Further, a wider variety of triggers can also be used with the described methods. For example, any combination of external events (e.g., a sensor trigger, motion detection) can be used to trigger a video window to be displayed in a particular layout.

INDUSTRIAL APPLICABILITY

It is apparent from the above that the arrangements described are applicable to the computer and data processing industries).

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of displaying live video data on a viewer, the live video data being captured by a plurality of cameras, the method comprising:
   selecting one of a plurality of queries, wherein the plurality of queries includes a query for motion detection;
   receiving metadata for the plurality of cameras, the metadata for each such camera including an event notification signifying detection or non-detection of motion, wherein the event notification is generated by analyzing the live video data captured by each such camera;
   if the selected query is a query for motion detection, matching the query for motion detection with the event notification signifying detection of motion in the metadata for one of said plurality of cameras;
   displaying live video data captured by said one camera in a window of a layout displayed on the viewer, responsive to a match of the query for motion detection with the event notification signifying detection of motion in the metadata for said one camera;
   receiving new metadata for said one camera;
   updating the received metadata with the new metadata if the received metadata for said one camera has been changed to the new metadata during the display of the live video data;
   re-evaluating whether there is still a match of the query for motion detection with the event notification signifying detection of motion in the updated metadata for said one camera; and
   responsive to a failed match of the query for motion detection with the event notification signifying detection of motion in the updated metadata for said one camera, preventing a display of the window for the displayed live video data of said one camera, from the layout displayed on the viewer.

2. The method according to claim 1, wherein motion detection is one of the plurality of queries, each of the queries being stored with a corresponding one of a plurality of layouts, each layout representing an arrangement of one or more video windows for displaying the video data.

3. The method according to claim 2, wherein the displayed video data is displayed in a layout corresponding with a selected query.

4. The method according to claim 1, wherein one window for the displayed video data is removed from the layout after a predetermined time.

5. The method according to claim 1, wherein one or more of the video windows corresponding to the displayed video data is removed from the corresponding layout a predetermined period after the corresponding camera no longer matches the selected query.

6. The method according to claim 1, wherein one or more of the video windows corresponding to the displayed video data is removed from the corresponding layout as soon as the video windows to be removed are acknowledged.

7. The method according to claim 1, wherein different weights are assigned to various attributes of metadata in a selected query.

8. The method according to claim 1, wherein the displayed video data is displayed by a first computer connected to a network and a selected layout and corresponding query are stored on a second computer connected to the network.

9. The method according to claim 1, wherein the displayed video data is displayed by a first computer connected to a network and a selected layout and a corresponding query are stored on the first computer.

10. The method according to claim 1, wherein the displayed video data is displayed for a predetermined period of time.

11. The method according to claim 1, wherein a selected layout includes settings for determining size of video windows in which the displayed video data is displayed.

12. The method according to claim 1, wherein the selected query corresponding with a layout controls size of video windows in which the displayed video data is displayed.

13. The method according to claim 1, wherein criteria for motion detection is one of a plurality of queries that can be selected by a user.

14. An apparatus for displaying live video data on a viewer, the live video data being captured by a plurality of cameras, the apparatus comprising:
    a processor, and
    a memory storing instructions that, when executed by the processor, cause the apparatus to:
    select one of a plurality of queries, wherein the plurality of queries includes a query for motion detection;
    receive metadata for the plurality of cameras, the metadata for each such camera including an event notification signifying detection or non-detection of motion, wherein the event notification is generated by analyzing the live video data captured by each such camera;
    if the selected query is a query for motion detection, match the query for motion detection with the event notification signifying detection of motion in the metadata for one of said plurality of cameras;
    display live video data captured by said one camera in a window of a layout displayed on the viewer, responsive to a match of the query for motion detection with the event notification signifying detection of motion in the metadata for said one camera;
    receive new metadata for said one camera;
    update the received metadata with the new metadata if the received metadata for said one camera has been changed to the new metadata during the display of the live video data;

re-evaluate whether there is still a match of the query for motion detection with the event notification signifying detection of motion in the updated metadata for said one camera; and responsive to a failed match of the query for motion detection with the event notification signifying detection of motion in the updated metadata for said one camera, prevent a display of the window for the displayed live video data of said one camera, from the layout displayed on the viewer.

15. A non-transitory computer readable medium, having a program retrievably stored thereon, where the program is configured to make a computer execute a method of displaying live video data on a viewer, the live video data being captured by a plurality of cameras, the program comprising:

code for selecting one of a plurality of queries, wherein the plurality of queries includes a query for motion detection;

code for receiving metadata for the plurality of cameras, the metadata for each such camera including an event notification signifying detection or non-detection of motion, wherein the event notification is generated by analyzing the live video data captured by each such camera;

code for, if the selected query is a query for motion detection, matching the query for motion detection with the event notification signifying detection of motion in the metadata for one of said plurality of cameras;

code for displaying live video data captured by said one camera in a window of a layout displayed on the viewer, responsive to a match of the query for motion detection with the event notification signifying detection of motion in the metadata for said one camera;

code for receiving new metadata for said one camera;

code for updating the received metadata with the new metadata if the received metadata for said one camera has been changed to the new metadata during the display of the live video data;

code for re-evaluating whether there is still a match of the query for motion detection with the event notification signifying detection of motion in the updated metadata for said one camera; and code responsive to a failed match of the query for motion detection with the event notification signifying detection of motion in the updated metadata for said one camera, for preventing a display of the window for the displayed live video data of said one camera, from the layout displayed on the viewer.

16. A system for displaying live video data on a viewer, the live video data being captured by one or more cameras, the system comprising:

a memory for storing data and a computer program; and a processor coupled to the memory executing the computer program, the computer program comprising instructions that, when executed, cause the system to:

select one of a plurality of queries, wherein the plurality of queries includes a query for motion detection;

receive metadata for the plurality of cameras, the metadata for each such camera including an event notification signifying detection or non-detection of motion, wherein the event notification is generated by analyzing the live video data captured by each such camera;

if the selected query is a query for motion detection, match the query for motion detection with the event notification signifying detection of motion in the metadata for one of said plurality of cameras;

display live video data captured by said one camera in a window of a layout displayed on the viewer, responsive to a match of the query for motion detection with the event notification signifying detection of motion in the metadata for said one camera;

receive new metadata for said one camera;

update the received metadata with the new metadata if the received metadata for said one camera has been changed to the new metadata during the display of the live video data;

re-evaluate whether there is still a match of the query for motion detection with the event notification signifying detection of motion in the updated metadata for said one camera; and responsive to a failed match of the query for motion detection with the event notification signifying detection of motion in the updated metadata for said one camera, prevent a display of the window for the displayed live video data of said one camera, from the layout displayed on the viewer.

17. A method of displaying live video data on a viewer, the live video data being captured by a plurality of cameras, the method comprising:

receiving metadata for the plurality of the cameras, the metadata for each such camera including an event notification signifying detection or non-detection of motion, wherein the event notification is generated by analyzing the live video data captured by each such camera;

responsive to a determination that the metadata for one of said plurality of cameras includes an event notification signifying detection of motion:

displaying live video data captured by said one camera in a window of a layout displayed on the viewer, receiving updated metadata from said one camera; and responsive to a determination that the updated metadata has changed relative to the received metadata during the display of the live video data, preventing a display of the window for the displayed live video data of said one camera, from the layout displayed on the viewer, if the updated metadata for said one camera no longer includes an event notification signifying detection of motion.

\* \* \* \* \*